Dec. 7, 1954  E. G. BLAING-LEISK  2,696,107
TESTING APPARATUS FOR DETECTING AND EJECTING CLIPPED CAN ENDS
Filed Oct. 13, 1950  6 Sheets-Sheet 1

INVENTOR
Edwin G. Blaing-Leisk
BY Mason, Porter, Diller & Stewart
ATTORNEYS

Dec. 7, 1954 E. G. BLAING-LEISK 2,696,107
TESTING APPARATUS FOR DETECTING AND EJECTING CLIPPED CAN ENDS
Filed Oct. 13, 1950 6 Sheets-Sheet 3

INVENTOR
Edwin G. Blaing-Leisk

BY Mason, Porter, Diller T Stewart
ATTORNEYS

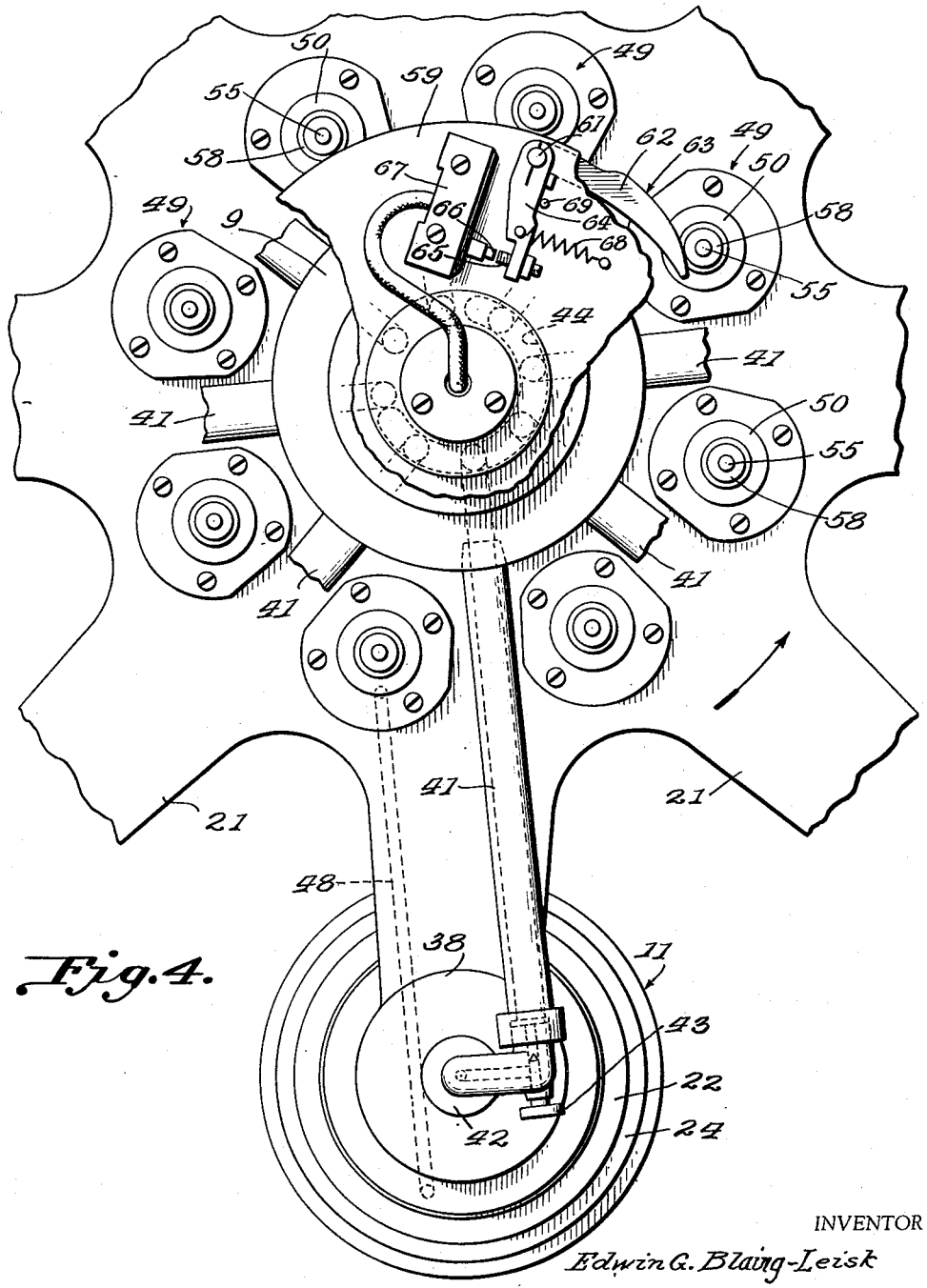

Dec. 7, 1954  E. G. BLAING-LEISK  2,696,107
TESTING APPARATUS FOR DETECTING AND EJECTING CLIPPED CAN ENDS
Filed Oct. 13, 1950  6 Sheets-Sheet 5
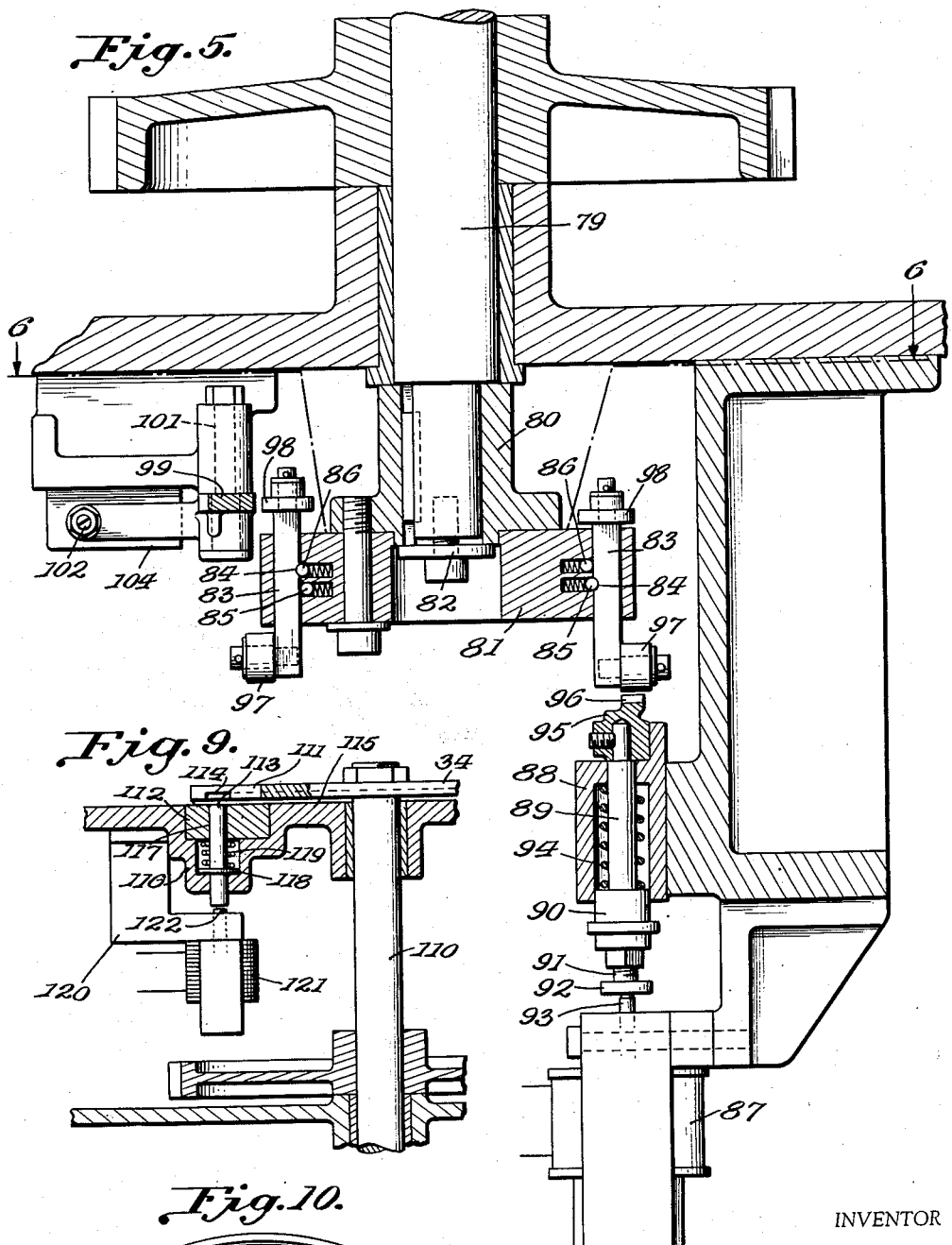
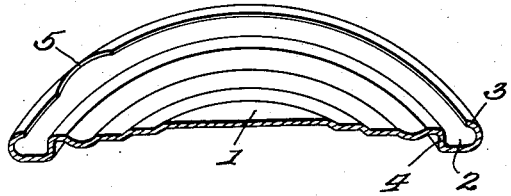
INVENTOR
Edwin G. Blaing-Leisk
BY Mason, Porter, Diller & Stewart
ATTORNEYS Dec. 7, 1954   E. G. BLAING-LEISK   2,696,107
TESTING APPARATUS FOR DETECTING AND EJECTING CLIPPED CAN ENDS
Filed Oct. 13, 1950   6 Sheets-Sheet 6
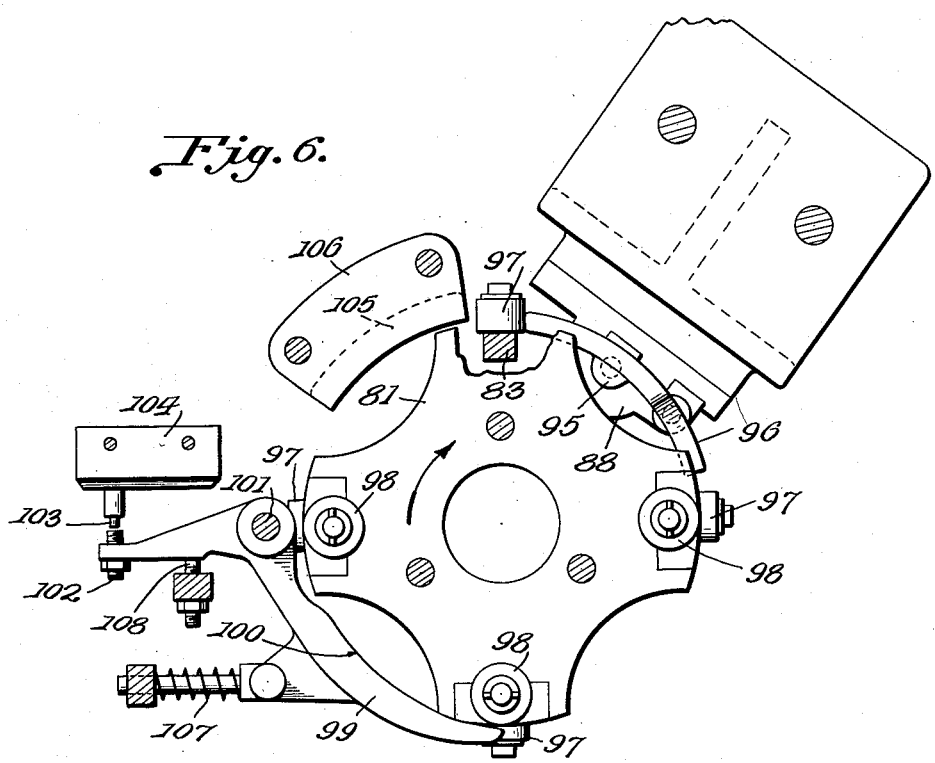
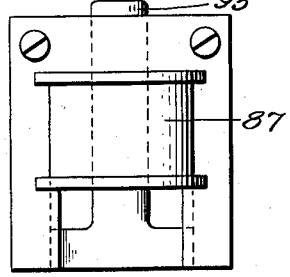
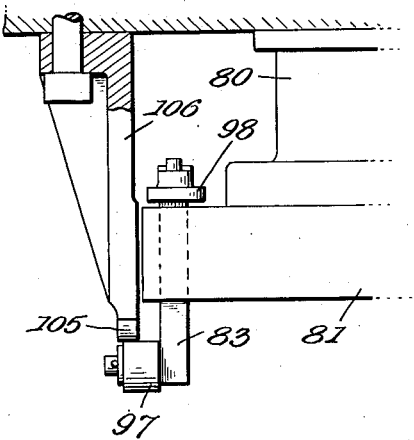
INVENTOR
Edwin G. Blaing-Leisk
BY Mason, Porter, Diller & Stewart
ATTORNEYS

United States Patent Office 2,696,107
Patented Dec. 7, 1954

2,696,107

TESTING APPARATUS FOR DETECTING AND EJECTING CLIPPED CAN ENDS

Edwin G. Blaing-Leisk, Chicago, Ill., assignor to Continental Can Company, Inc., New York, N. Y., a corporation of New York Application October 13, 1950, Serial No. 189,991

4 Claims. (Cl. 73—43)

The present invention relates to an air pressure can end testing apparatus for detecting and ejecting can ends which have been clipped during the forming of the end from a sheet of metal.

An object of the invention is to provide a can end testing apparatus wherein the peripheral portion of a can end forms one wall of an air pressure chamber and thus a clipped end is detected by its failure to close the chamber so that pressure can be built up therein.

A further object of the invention is to provide an apparatus of the above type wherein the failure to close the chamber and permit air pressure to be built up therein initiates a train of mechanism which ejects the clipped end from the testing apparatus.

A further object of the invention is to provide an apparatus of the above type wherein a plurality of testing units receive the ends one after another from a stack, and wherein the ends found to be imperfect after leaving the testing units are ejected while the perfect ends pass on to a restacking mechanism, a coating machine or some other place for use.

A still further object of the invention is to provide an apparatus of the above type wherein a switch is closed when the end being tested is imperfect and wherein the closing of the switch initiates a delayed action mechanism for ejecting the imperfect end after it has left the testing unit.

Another object of the invention is to provide an apparatus of the above type wherein the imperfect or clipped end is forced from a transfer turret carrying the same by a pin moved across the path of travel of the can end.

These and other objects will in part be obvious and will in part be hereinafter more fully described.

In the drawings which show by way of illustration one embodiment of an apparatus for detecting and ejecting clipped can ends:

Figure 3:
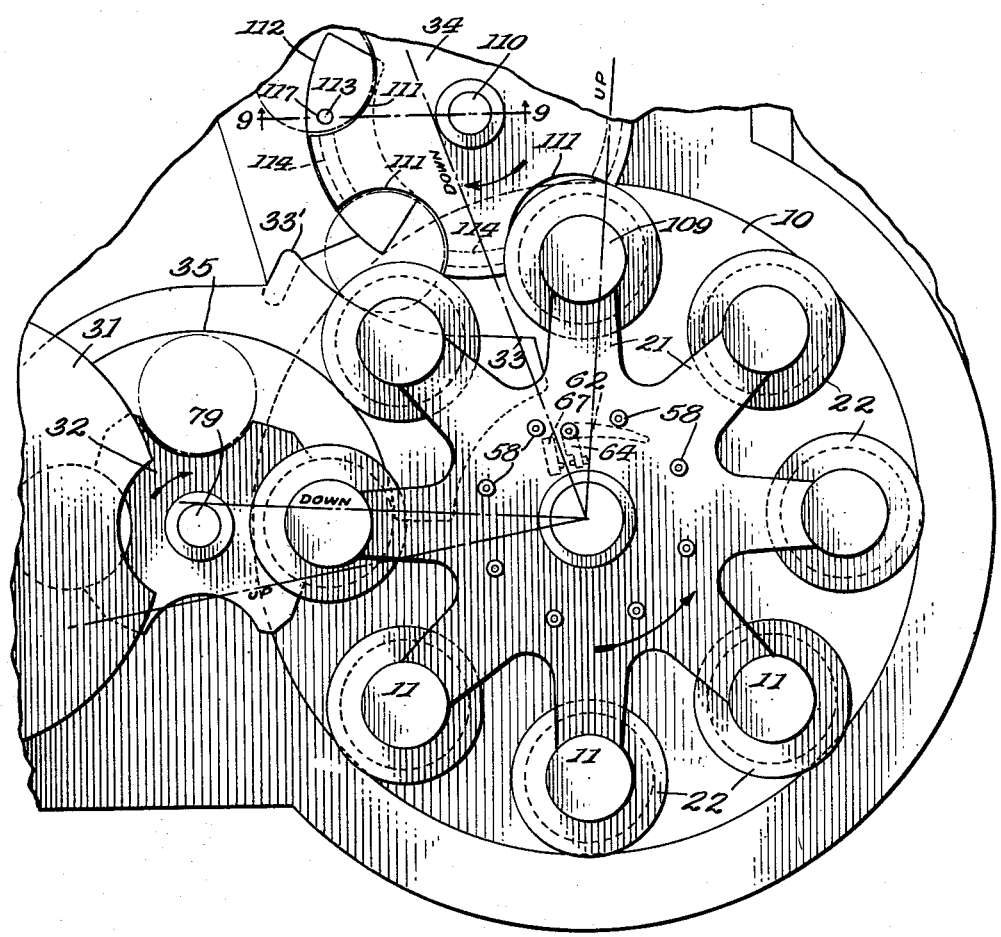

Figure 3 is a diagrammatic view showing in plan the testing units, the means for feeding can ends thereto and means for removing the can ends from the testing units after the testing operation. This view also shows very diagrammatically the switch and the location of the devices associated with each testing unit for operation on the switch arm which closes the switch in case the end is a clipped end;

Figure 4 is a plan view on an enlarged scale showing one of the testing units, the diaphragm controlled devices for closing the switch that brings about the ejection of a can end found to be clipped in the testing operation;

Figure 5 is a vertical sectional view through the delayed action mechanism which is set by the testing mechanism when the end is clipped so that at a later period in the operating of the testing mechanism and after the defective can end has left the testing unit, it will be ejected from the path of travel of the perfect ends;

Figure 6 is a plan view of the delayed action turret which carries the devices moved to a different set position when the end is defective and the cams associated therewith for controlling the ejection of the defective end and resetting the devices;

Figure 7 is a side elevation of the cam and associated solenoid which is operated when the switch is closed for raising the cam which controls the setting of the delayed action devices;

Figure 8 is a view partly in section showing the cam operating upon the delayed action setting devices for returning them to normal position;

Figure 9 is a view partly in section and partly in side elevation of the solenoid operated by the delayed action mechanism for lifting the ejecting pin into the path of travel of the can ends, also showing in section the magnet which holds the can ends in the discharge turret unless forcibly ejected therefrom by the lifting of the pin; and Figure 10 is a perspective view showing a portion of a can end turned upside down and having a clipped peripheral edge portion.

The invention has to do with an apparatus for testing and ejecting can ends which are clipped.

In Figure 10 of the drawings there is shown a can end 1 having the usual peripheral channel portion 2 with the curled peripheral edge 3.

Figure 1:
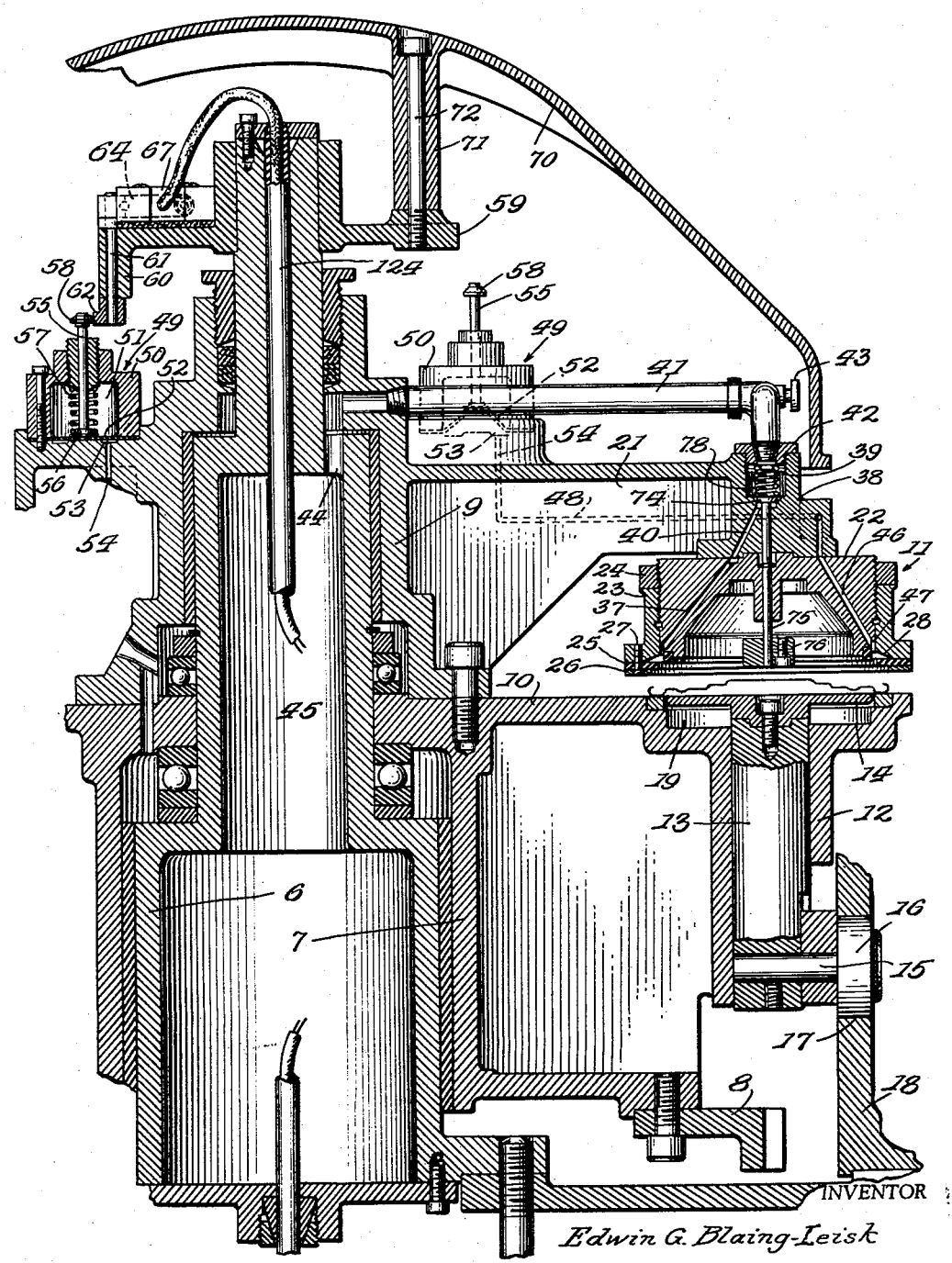
Figure 1 is a vertical sectional view through a portion of the testing turret and one of its associated units, also showing an electric switch and the means operated to close the switch when the end being tested is clipped.

It is common practice to cut sheets into scroll strips from which two or more can ends are formed at the same time by an automatically operating punching and die shaping machine. In the formation of each end a circular disc is cut from the strip. This disc is die shaped so as to provide a central depression adapted to receive a chuck in the seaming operation. Surrounding this depression is a vertical wall 4. After the end has been shaped it is discharged from the die shaping machine and the peripheral edge is then curled so as to provide what is referred to as a curled edge indicated at 3 in Figure 10. This curled edge facilitates the rolling of the peripheral portion of the can end and the flange on the body wall of an open top can into a double seam for hermetically closing the can. A sealing composition is placed in the channel 2 of the end. It sometimes happens that the scroll strip does not come into proper registration with the die and a segment of its edge is clipped away as indicated at 5 in Figure 10. This makes an imperfect end which is liable to cause a leaky double The purpose of the present apparatus is to test the can ends one after another and detect and eject from the path of travel of the ends all the ends which are clipped enough to cause a defective seam. The testing machine employed in the testing apparatus is of the turret type rotating about a vertical axis. A portion of the machine is shown in Figure 1 of the drawings. The machine includes a center column 6 on which the revolving parts are mounted. These revolving parts include a lower sleeve 7 carrying a gear 8 which is operated in any suitable way for rotating the sleeve on the column. Attached to this rotating sleeve 7 is an upper rotating sleeve 9. The sleeve 7 carries a horizontal table 10 which supports the lower part of a plurality of testing units.

As shown in Figure 3, there are a series of testing units indicated in general by the numeral 11. These units are all similar in construction and a description of one will answer for the other. The table 10 at each unit has a depending sleeve 12 in which is a plunger 13 carrying at its upper end a can end supporting disc 14. This plunger is provided with a rod 15 carrying a roller 16 running in a cam groove or slot 17 formed in the stationary frame structure 18 of the machine. Each unit is also provided with a recess 19 in which the can end support 14 is mounted.

The sleeve 9 is provided with a series of projecting arms 21, one for each testing unit, and a testing head 22 carried at the outer end of each arm. Each testing head is directly above the can end supporting disc 14. This testing head 22 is shown more in detail in Figure 2. The head includes an outer sleeve member 23 which is threaded onto the head and secured by a locking collar 24. At the lower end of the sleeve member is a gasket ring 25 which is clamped against the lower end of the sleeve by a ring 26 and securing bolts 27. The lower face at the inner side of the sleeve is cut away to form a chamber 28. This gasket 25 projects inwardly beyond the ring 26 and into the chamber 28. A thin metal facing washer 29 preferably of tempered spring steel about .005" thick is disposed just beneath the gasket 25. The sealing element must be flexible enough to seal on a wavy curled rim, and yet not press into or fill up the shallow depression of a clip. Mounted in the head 22 at the inner side of the chamber 28 is a ring gasket 30.

Figure 2:
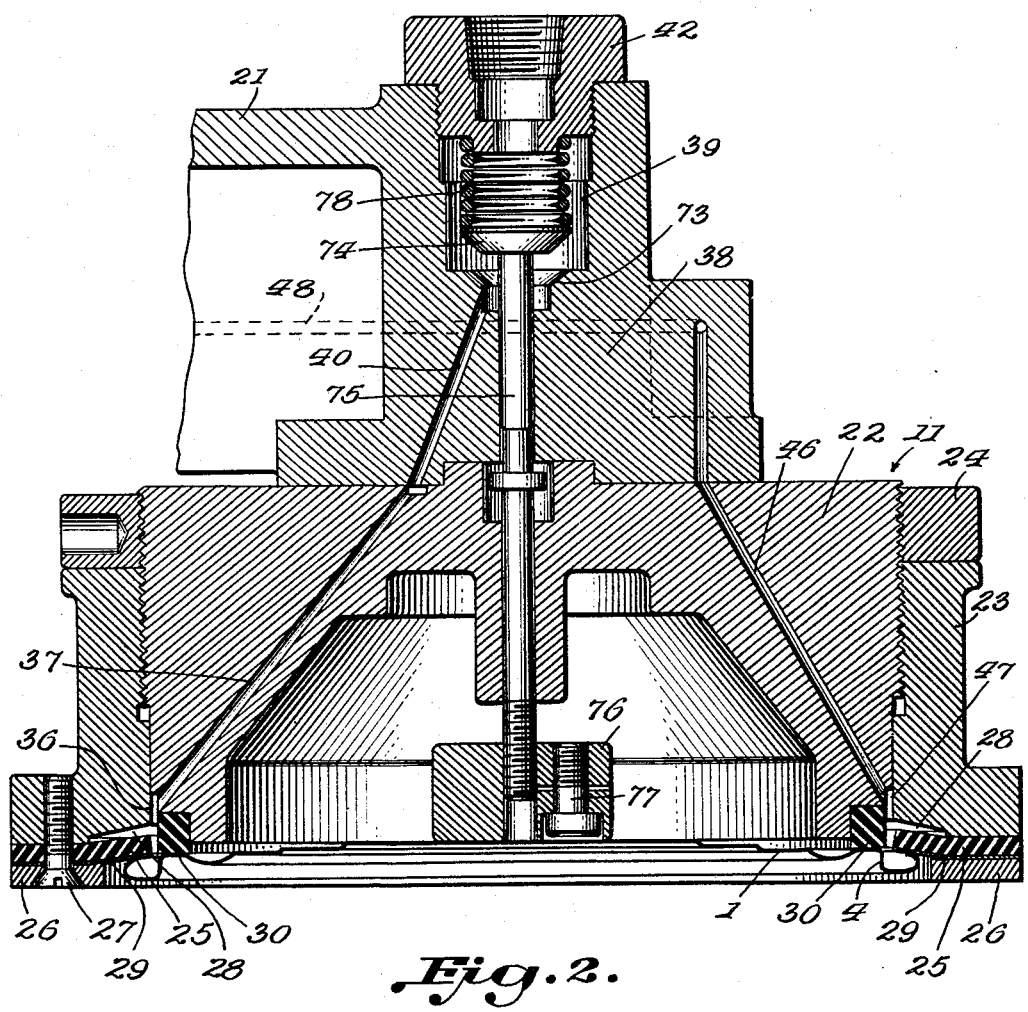
Figure 2 is a view on a very much enlarged scale of the testing unit and showing the can end in position for testing.

In Figure 2 the can end to be tested is indicated at 1 and it is raised by the support 14 into contact with the gasket 30 and the facing washer 29. The peripheral edge of the can end contacts this steel washer and if this edge is continuous and not clipped, the edge will make a practically air tight joint when the chamber 28 is subjected to air under pressure. If, however, the end is clipped as shown at 5 in Figure 10 then, of course, air will escape through this clipped opening and air pressure cannot be built up in the chamber 28. The portion of the can end radially inward from the vertical wall 4 contacts with this gasket 30 in completing the closure of the chamber 28. In other words, the peripheral portion of the can end forms one wall of this testing chamber 28, and, as noted, if the end is not clipped air pressure will be built up in the chamber 28. If the end is clipped, then the air pressure in the chamber will be reduced by the air escaping at the clipped edge.

The can ends are taken from the usual stack indicated at 31 by a transfer turret 32. This transfer turret 32 is connected to the testing turret by a suitable train of mechanism so that the two turrets are operated in timing with each other. The ends pass between the testing head 22 and the table 10 and will be deposited on the table above the can end support 14. The can end support at the time when the can end is placed beneath the testing unit is in the lowered position as shown in Figure 1. As the unit travels the roller 16 raises the support 14 which lifts the can end to the position shown in Figure 2 and holds it pressed against the gaskets until the testing has been completed, after which this roller 16 lowers the can end support 14 to its initial lower position and then a usual form of guide 33 operates to remove the end from the testing unit and position the same in a pocket of a transfer turret 34 (see Figure 3). The guide 33 also has a guide face 35 associated with the transfer turret 32 for directing the ends into the testing units.

The chamber 28 is extended upwardly at 36 and a passage 37 in the head 22 is connected to this extension 36 of the chamber and it is through this passage 37 that air under pressure is directed into the chamber 28.

Mounted on the upper side of the head 22 and travelling therewith is a cylindrical member 38, said member 38 has a chamber 39 formed therein and a passage 40 connects the chamber 39 with the passage 37. A pipe 41 is connected to a coupling 42 which is threaded into the upper end of the member 38 and forms a closing wall for the chamber 39. This coupling 42, as shown in Figure 4, is provided with a needle valve 43 of the usual construction. The pipes 41 of the various units are connected to a header 44. This header 44 extends part way around the column 6 and is connected to the chamber 45 formed by the hollow column. This chamber 45 is maintained under air pressure in any suitable way. As the pipes 41 are connected one after another with this header 44 in the rotation of the turret, air under pressure will be directed through the needle valve 43 and the passages 40 and 37 to the chamber 28. If the end is a perfect end, air pressure will be built up in the chamber 28.

In the head 22 is a passage 46, which passes through a connecting branch 47 which leads to the chamber 28. This passage extends to the chamber 28 and is connected to a pipe 48 shown in dotted lines in Figure 1.

Associated with each testing unit is a detecting device 49. This detecting device includes a cap 50 having a chamber 51 therein. The cap clamps a diaphragm 52 to a projecting portion carried by the sleeve 9. On the underside of the diaphragm is an annular channel 53 and the pipe 48 is connected through the passage 54 to this channel 53. Disposed within the cap is a rod 55 having a head 56 which is pressed against the diaphragm by a spring 57. If the testing chamber 28 is closed by an unclipped end then pressure will be built up beneath the diaphragm 52 and this will lift the diaphragm as shown at the right in Figure 1. At the upper end of the rod 55 is a roller 58.

Mounted on the upper end of the column 6 is a disc 59. This disc is supported by the column and is stationary. The disc has a depending lug 60 in which is mounted a shaft 61 which shaft at the lower end thereof carries an arm 62 provided with a cam face 63 (see Figure 4). This shaft 61 at the upper end thereof carries an arm 64. On the outer end of the arm 64 is an adustable bolt 65 which is adapted to contact with the operating member 66 of a switch 67. A spring 68 connected to the arm 64 normally holds the arm pressed against the stop 69.

When there is air pressure built up in the chamber 28 it lifts the diaphragm so as to raise the rod 55 and place the roller 58 in its path of travel well above the cam face 63, on the arm 62. If, however, the end is clipped so that the chamber 28 is not closed completely and air leaks out, no air pressure is built up in the chamber and the spring 57 will hold the diaphragm in the position shown at the left of Figure 1. The roller when thus positioned will contact with the cam face 63 and close the switch. This initiates a train of mechanism, which will hereinafter be described, that brings about the ejection of the clipped end from the path of travel of the perfect ends.

A cover 70 for protecting the switch and the testing units is supported by the disc 59. The cover has at intervals depending sleeves 71 and bolts 72 extending through these sleeves 71 are threaded into the disc 59.

Between the chamber 39 and the passage 40 is a valve seat 73. A valve 74 is adapted to engage said seat and cut off the air leading from the chamber 39 to the testing chamber 28. Attached to the valve is a valve stem 75 which extends down through the testing unit head into the chamber just above the container end. On the lower end of the stem is a block 76 which may be adjusted on the same and secured in adjusted positions by means of a bolt 77. A spring 78 bears on the upper side of the valve and normally forces the valve into seated position.

In Figure 1 the valve is shown seated and the air cut off from the testing chamber. At this time the can end has been placed on the can end support, but has not been raised into contact with the gaskets. When the can end is raised it will contact with the block 76 and will open the valve so that air under pressure will be directed into the testing chamber 28 when the can end is seated against the gaskets. The purpose of the steel facing washer 29 is to provide a hard flexible surface which will contact the continuous wavy edge of a can end to provide a tight seal, and will not fill a recess or depression therein caused by a clip. The contact of the end with the washer 29, if the end is not clipped, is sufficient to provide a sufficiently tight closure for the chamber 28 so that air pressure can be built up therein. If the end is clipped then air will escape through the opening between the end and the plate and no appreciable air pressure can be built up in the chamber 28.

If the end is clipped so that no pressure builds up on the chamber 28 then the roller 58 of the unit carrying the defective end will not be raised and will contact the cam 63 on the arm 62 and the switch will be closed only while the roller is passing along the cam 63. It is impossible to remove the end from the testing unit during this short path of travel of the roller along the cam and, therefore, a delayed action mechanism is associated with the testing units for bringing the ejection of a clipped end after it has left the testing unit and is on its way with the perfect ends either to a restacking mechanism, a coating machine, or some other place of use. This delayed action mechanism is shown in detail in Figures 5 to 8 of the drawings.

The transfer turret 32 which feeds the can ends from the stack into the testing units is mounted on a shaft 79 which is operated as above noted in timing with the rotation of the testing turret. On the lower end of this shaft 79 is a sleeve 80 which is splined to the shaft and to the sleeve is bolted a turret head 81. A plate 82 secured to the lower end of the shaft holds the sleeve on the shaft. This turret head carries four ejector operating units, each of which is in the form of a rectangular bar 83 adapted to slide vertically in a guiding passage in the turret head 81. This bar has a semi-circular seat 84 formed therein. A spring pressed ball 85 engages this seat 84 when the bar 83 is in its lower position, said bar, in case of a defective end, is raised and will be held in raised position by a spring pressed ball 86 entering the seat 84. In other words, this bar 83 can be forced from one position to the other and will remain in the position to which it has been moved. When the switch 67 is closed it will energize the solenoid 87. Just above this solenoid is a guide sleeve 88 in which a rod 89 may be vertically reciprocated.

At the lower end of the rod is a head 90 in which a screw 91 is threaded. This screw carries a flat disc 92 which is adapted to be engaged by a movable pin 93 acted upon by the core of the solenoid 87. A spring 94 normally holds the disc in contact with the pin 93 and the pin will be at its lowest position when the solenoid is not being energized. Mounted on the upper end of the rod 89 is a shoe 95 carrying a cam rail 96. On the lower end of the bar 83 is a roller 97. When this cam rail 96 is in its lower position, the rollers 97 will pass over the same without contacting the cam rail. When the can end is defective and closes the switch 67 and energizes the solenoid 87, this cam rail will be raised so that the roller 97 will contact the same and thus the bar 83 is raised from engagement with the ball 85 to a point where the ball 86 will enter the ball seat 84 and thus hold the bar in its raised position, after the roller 97 runs off from the cam rail.

The opening of the switch 67 will deenergize the solenoid and the cam rail will drop to the position shown in Figure 5 of the drawings. This positions this cam rail for operation upon the next roller 97 of the next ejecting unit provided that the end is defective.

Mounted on the upper end of the bar 83 is a roller 98. Associated with the rollers 98 on the several ejecting units is a cam 99 having a cam face 100. On the other end of this arm which is pivoted at 101 is an adjustable screw 102 which is adapted to contact with a pin 103 of the switch 104. If the bar is not raised because all of the ends being detected are perfect then these rollers 98 will pass beneath the arm 99 and will not contact with the cam face 100. If, however, the bar 83 is raised to its uppermost position by reason of a defective end then the roller will contact the cam 100 and cause the switch 104 to be closed.

When the roller 98 moves off the cam 100 and it has completed its operation so far as ejecting the clipped end is concerned, and the roller 97 associated therewith passes underneath a stationary cam 105 carried by a bracket 106, this will force the bar 83 to its lowermost position where the seat 84 engages the ball 85. There is a spring 107 associated with the arm 99 which moves the arm into contact with an adjustable stop 108, as soon as the roller 98 moves out of contact with the cam 100.

After the testing units pass the position indicated at 109 (Figure 3), the ends are taken away from the testing units by a transfer turret 34 rotating about the axis 110. The guide member 33 is relatively thin and extends between the rotary table 10 and the testing head 11 and will engage the can end and force it from the testing unit into one of the pockets 111 of the transfer turret 34. When the end is removed from the testing unit it is slid along a supporting table.

Referring to Figure 3, the can end is taken from the stack by a transfer turret 32 and is moved along the guide 35 into the turret beneath the testing head. The can end support is down at the radial line marked "down" and the can end is therefore moved by the transfer turret over the can end support. The can end support moves up, clamping the end against the testing head and is in its full raised position at the radial line marked "up." It is noted that the end is lifted from the table just as it leaves the guide 35 and while it is still under control of the transfer turret. The end will be held clamped against the testing head into which it is fed until the turret reaches the discharge point where the can end is forced from the turret into the pocket of the transfer turret 34. Again the can end support is up clamping the end against the head when the radial line marked "up" is reached and the can end support is entirely freed from the end when the radial line marked "down" is reached. At this time the can end is under the control of the transfer turret and the guide 33 which strips the can end from beneath the testing head into the transfer pocket. It will be noted from the above that the can end is always under control as it is moved into and out of the testing head therefor. The guide rail 33 terminates at 33′ and for a short space there is no guide rail associated with the transfer turret 34. In lieu thereof is a magnetic segment 112. This segment is curved on a radius, the center of which is the axis of the rotating transfer turret 34. The magnet prevents the unclipped can ends from being thrown out of the turret pocket 111 because of the absence of the guide rail.

If the end which has been tested is clipped then a pin 113 is raised so as to lie in the path of movement of the can end. The can end will contact the pin at a point so that the end will be pushed out of the pocket in the transfer turret. The underface of the transfer turret is slotted as indicated at 114 and the pin which is raised up through the magnet will enter this slot and this will prevent any can end from being crowded between the upper end of the pin and the transfer turret 34.

In Figure 9 there is a detail showing the shaft 110 which carries this transfer turret 34. The supporting table along which the can ends are moved is indicated at 115. The magnet 112 is flush with the top of the table and the can ends will be moved along the table and over the magnet by the transfer turret 34. The pin 113 is mounted for reciprocation in a guiding member 116 formed as a part of the table. This pin passes up through an opening 117 in the magnet. The pin is provided with a disc 118 which is fixed thereto. A spring 119 holds the pin in its lower position so that the upper end is either flush or slightly below the surface of the table 115. Beneath the pin is a bracket 120 on which is mounted a solenoid 121. The core 122 of this solenoid engages the lower end of the pin 117 when this solenoid is energized and this will raise the pin above the surface of the table and into the slot 114.

When a clipped end is tested by a testing unit, the chamber 28 will not be completely closed so that pressure can be built up therein. The result is that the roller 58 associated with this testing unit containing the clipped end will not be raised by a flexing of the diaphragm associated therewith and, therefore, a roller will contact with the cam 63 on the arm 62 and close the switch 67. Wires leading from the switch 67 pass down through a tube 124 to the solenoid 87 and the solenoid will be energized, causing the bar 83 to be raised. This raising of the bar positions the roller 98 so that later on, in the cycle of rotation of the turret head 81, the roller will contact the cam 100 and close the switch 104. When the switch 104 is closed the solenoid 121 is energized and this will raise the pin 113. This time period between the energizing of the solenoid 87 by closing the switch 67 and the energizing of the solenoid 121 by the closing of the switch 104 is of sufficient length so that the testing unit which brought about the closing of the switch 67 will pass to the point of discharge and the end will be removed from the unit and brought into contact with the raised pin and thus ejected from the transfer turret 34. Of course, all can ends will be taken from the testing unit by the discharge turret 34 and cooperating guide rail 33. The perfect or non-clipped can ends will pass from the discharge turret 34 either to a restacking mechanism, or a coating machine, or any other place of use.

An air pressure of 6 lbs. has been found satisfactory for testing can ends for clips. The size or smallness of the clip to be rejected is controlled by the volume of air admitted to the chamber 28, and as the air volume is controlled by the needle valve 43, the minimum size of clip to be rejected can be selected by adjustment of the needle valve. If it is determined that clips smaller than a certain size will not cause a leak when embodied in a double seam, then the needle valve may be adjusted so that can ends having such clips will not be rejected.

It is believed that the operation of the testing apparatus for detecting and ejecting clipped ends will be clearly understood from the detailed description which has been given in connection with the various mechanisms, and further description thereof is not necessary.

It is obvious that many changes may be made in the details of construction and the arrangement of the parts without departing from the spirit of the invention as set forth in the appended claims.

I claim:

1. A detector ejector apparatus for clipped can ends, comprising testing units for detecting ends which are clipped, means for feeding ends to the testing units, means for removing the ends from the units after testing, and means operating in conjunction with the removing means for ejecting ends found to be clipped, each testing unit including a testing head having a testing chamber open at the lower side of the head, a sealing gasket at the inside of said opening and a sealing gasket at the outer side of said opening, a thin flexible steel plate covering the lower face of the outside gasket, said opening being closed by the inverted peripheral portion of the can end being tested with the curled edge of the can end contacting said plate, means for supplying air to said testing chamber under pressure, and means initiated by the testing unit for operating the ejecting means when an end being tested fails to close the testing chamber.

2. A detector and ejector apparatus for clipped can ends, comprising a rotating turret having a plurality of testing units for detecting ends which are clipped, means for feeding ends to the testing units, means for removing the ends from the units after testing, and means for ejecting ends found to be clipped, each testing unit including a head having a testing chamber, one wall of which is formed by the peripheral portion of an inverted can end being tested, means for supplying said chamber with air under pressure, each unit having means for initiating the ejecting means when the end being tested fails to close said chamber, said initiating means including a detector chamber connected to the testing chamber, a diaphragm forming a wall of said detector chamber, a rod spring pressed against said diaphragm, a roller carried by said rod and moving in an annular path about the axis of said turret, an arm lying in the path of said roller when the diaphragm is in non-flexed position, an electric switch closed by said arm when contacted with by said roller, said roller being lifted out of contact with said arm when the diaphragm is flexed by built up air pressure in the testing chamber.

3. A detector and ejector apparatus for clipped can ends, comprising a rotating turret having a plurality of testing units for detecting ends which are clipped, means for feeding ends to the testing units, means for removing ends from the units after testing and for moving said ends along a path for discharge, and means cooperating with the removing means for ejecting ends found to be clipped, said ejecting means including a pin movable into the path of the can ends, a solenoid for operating said pin and mechanism initiated by a testing unit when an end is found to be clipped for energizing said solenoid, said mechanism including a rotatable turret head, a bar carried by said turret head and yieldingly held in operative and inoperative positions, a cam controlled by a testing unit and movable into position for shifting said bar to operative position, a roller carried by the bar, a switch and an arm contacted and moved by the roller when raised for closing the switch, said switch when closed operating to energize the solenoid for lifting the pin to ejecting position for rejecting an end found to be clipped.

4. A detector and ejector apparatus for clipped can ends comprising a rotatable turret, testing units mounted on said turret for detecting ends which are clipped, means for feeding ends to the testing units on the turret, means for removing the ends from the turret after testing, means cooperating with the removing means for ejecting therefrom ends found to be clipped, a delayed action mechanism initiated by a testing unit when an end is found to be clipped for controlling the operation of the ejecting means, said delayed action mechanism including a rotatable turret head, a bar carried by said turret head and yieldingly held in operative and inoperative positions, a cam controlled by the testing unit and movable into position for shifting said bar to operative position, a roller carried by the bar, a switch and an arm contacted and moved by the roller when raised for closing the switch, said switch when closed operating to energize a solenoid for rendering operative the ejecting means.

References Cited in the file of this patent

UNITED STATES PATENTS

| Number | Name | Date |
| --- | --- | --- |
| 1,316,549 | Winkley | Sept. 16, 1919 |
| 1,359,799 | Gerhardt | Nov. 23, 1920 |
| 2,217,342 | Ladrach | Oct. 8, 1940 |
| 2,338,868 | Owens | Jan. 11, 1944 |
| 2,352,091 | Fedorchak | June 20, 1944 |
| 2,383,297 | Dorothea | Aug. 21, 1945 |
| 2,400,507 | Henszey | May 21, 1946 |
| 2,407,062 | Darrah | Sept. 3, 1946 |
| 2,421,484 | Diamond | June 3, 1947 |
| 2,538,887 | Smith | Jan. 23, 1951 |